Sept. 21, 1926.  A. C. DURDIN, JR  1,600,809

AUTOMOBILE WINDOW SCREEN

Filed August 20, 1923

Inventor:
Augustus C. Durdin, Jr.
by Charles O. Shervey,
his Atty.

Patented Sept. 21, 1926.

1,600,809

UNITED STATES PATENT OFFICE.

AUGUSTUS C. DURDIN, JR., OF CHICAGO, ILLINOIS.

AUTOMOBILE WINDOW SCREEN.

Application filed August 20, 1923. Serial No. 658,209.

This invention relates to automobile window screens, and its principal object is to provide a removable and replaceable window screen for windows of automobiles of the "closed body" type. It is well known that flies, bees, and other winged insects fly into automobiles, thereby annoying the occupants and sometimes accidents result as a consequence, because the driver's attention is distracted from his task of driving the car. With the use of screens for the window openings, insects are kept out while the car is in motion and also while standing still. An object of the invention is to provide a removable window screen for automobiles, which can be installed instantly, will not mar the finish of the body, and will not rattle. With these and other objects and advantages in view, this invention consists in the several novel features hereinafter fully set forth and claimed.

Figure 1:
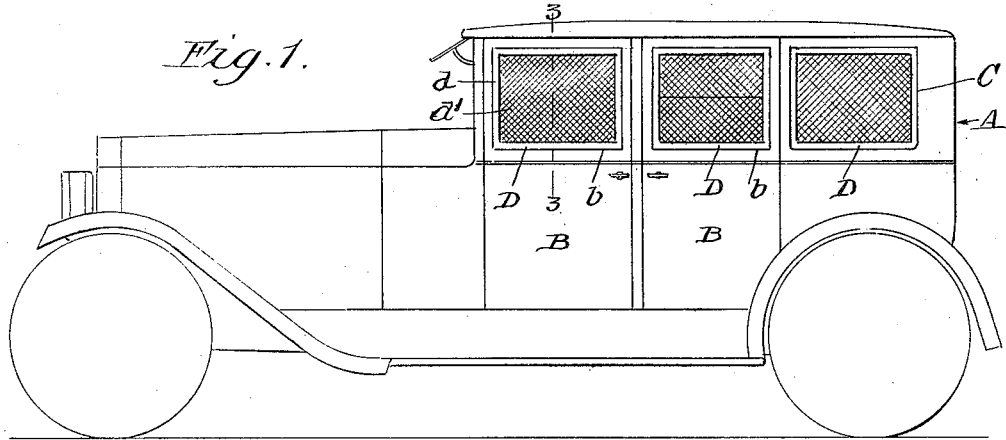
Figure 3:
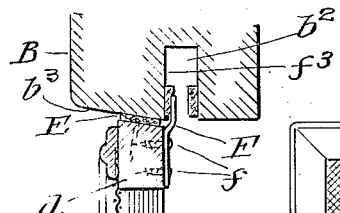
Figure 2:
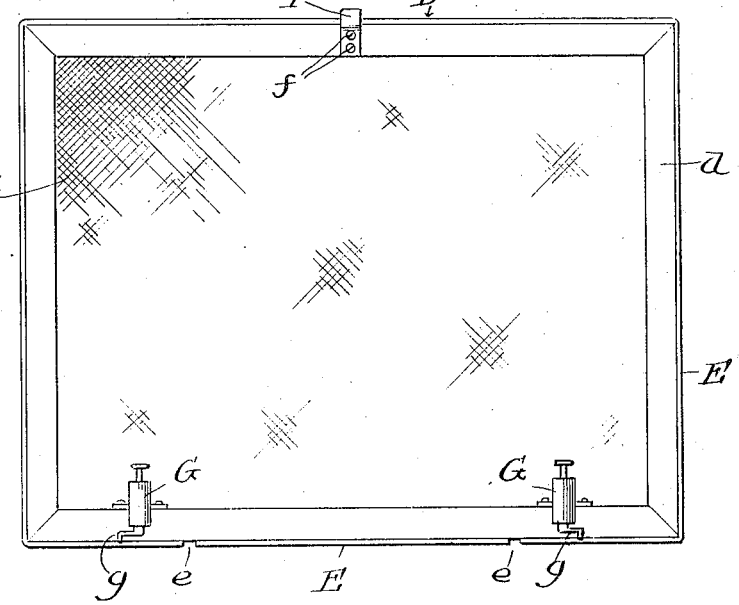
Figure 2:
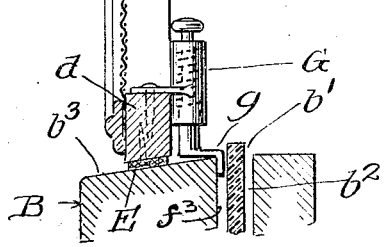

The invention is clearly illustrated in the accompanying drawing, in which:

Fig. 1 is a side elevation of an automobile of the "closed body" type, illustrating several window screens, embodying a simple form of the invention, affixed thereto; Fig. 2 is a side elevation of one of the screens, looking in the opposite direction from that seen in Fig. 1, and Fig. 3 is a detail vertical section on line 3—3 of Fig. 1.

Referring to said drawing, which illustrates one embodiment of the present invention, the reference character A, designates the body of an automobile of the "closed body" type, B, B designate doors thereof, and $b$, $b$ the window openings of the doors. C designates a window opening which, in some cases, occupies the space back of the rear door B. The windows $b^1$ are contained in chambers or pockets $b^2$, and are movable up and down to open and close the openings, as is well understood. In most cars the outer edge portions $b^3$ of the window frames or casings slope outward as shown.

The window screen D comprises a frame $d$, which practically fills and fits the window openings, and a wire mesh screen $d^1$ which is secured thereto by a moulding or otherwise as is desired. A strip or strips of pliable material E, such as felt, rubber, or cushioning material, is secured to the screen frame in position to engage the window frame or casing, or marginal edge of the window opening, for which the screen is intended, to thereby prevent the screen from marring the finish thereof, and to eliminate noise. In its present form the cushioning strip E is secured along the marginal edge of the screen frame (which is beveled to conform to the bevel of the window casing) and the cushioned edges of the screen frame fit snugly against said marginal edge portions of the window frame. Nails, tacks, or the like, may be used for securing the strip to the screen frame, or it may be fastened thereto in any other well known manner as is desired.

For removably securing the window screen in place, simple means are provided, which, in the form illustrated, comprise one or more thin strips of metal F, secured to the inner side of the screen frame by screws or the like $f$, and having a thin end portion or finger which projects beyond the screen frame, and is arranged to enter the usual window channel or pocket $b^2$ and engage with the inner face $f^3$ thereof. One or more latches or bolts G, are provided at the opposite side of the screen frame for engagement with the inner face of the channel or window pocket. In its present form slidable spring bolts are used, which are fastened to the lower member of the screen frame and have thin fingers $g$, that enter the window pocket and engage with the face $f^3$ thereof.

The window screen is installed by inserting the upper finger F, into the upper portion of the window channel and forcing the screen frame tightly into the window opening, and finally lowering the fingers $g$ of the bolts G into the window pocket, where they engage with the face $f^3$ thereof.

It will be noted that the window $b^1$ may be raised or lowered without interfering with the screen or its connections and that, when open, the occupants are protected against the entrance of flies, bees, and other insects and light objects.

In many cases the edge portion of the window or window frame has a felt strip for making a tight closure between the window and casing, especially at the bottom, to prevent the accumulation of water between the lower member of the screen frame and the window, in case of rain. The lower part of the cushioning strip E, may have one or more transverse passage ways $e$, formed therein, or gaps may be left between ends of the strip to form passageways through which water may escape.

From the above, it will be seen that the interior of the car may be kept free from flies, bees, bugs, etc., with its windows open, the wind shield may be kept closed or may be provided with a window screen especially adapted for it, the construction of which forms no part of the present invention.

During cold weather the screens may be readily detached from the car and removed for storage.

By the term "closed body" type of automobile, I desire to be understood as including automobile bodies of the "touring" or "roadster" type, equipped with a closed top such as is used for converting an open body automobile into a "closed body" type.

It will be noted that the screens may be installed in place in an automobile, solely by attaching means mounted on the screen, and that the finish of the automobile is not likely to be marred or otherwise injured by the attaching means.

More or less variation of the exact details of construction is possible without departing from the spirit of this invention; I desire, therefore, not to limit myself to the exact form of the construction shown and described, but intend, in the following claim, to point out all of the invention disclosed herein.

I claim as new and desire to secure by Letters Patent:—

An automobile window screen for an automobile window having a movable glass window panel and a window frame formed with a channel for the glass window panel to slide in, said screen comprising a removable screen frame having a cushioned edge portion and arranged for engagement with said window frame, a wire mesh insect screen secured to said screen frame, and thin fingers secured to opposite edges of said screen frame and arranged for engagement with a side of said channel, said fingers operating to hold said cushioned edge of the screen frame in close contact with said window frame while permitting free operation of the glass window panel when the screen is in place.

AUGUSTUS C. DURDIN, Jr.